J. A. JOHNSON.
PLANTER ATTACHMENT.
APPLICATION FILED JUNE 12, 1913.
1,083,446.
Patented Jan. 6, 1914.
2 SHEETS—SHEET 2.
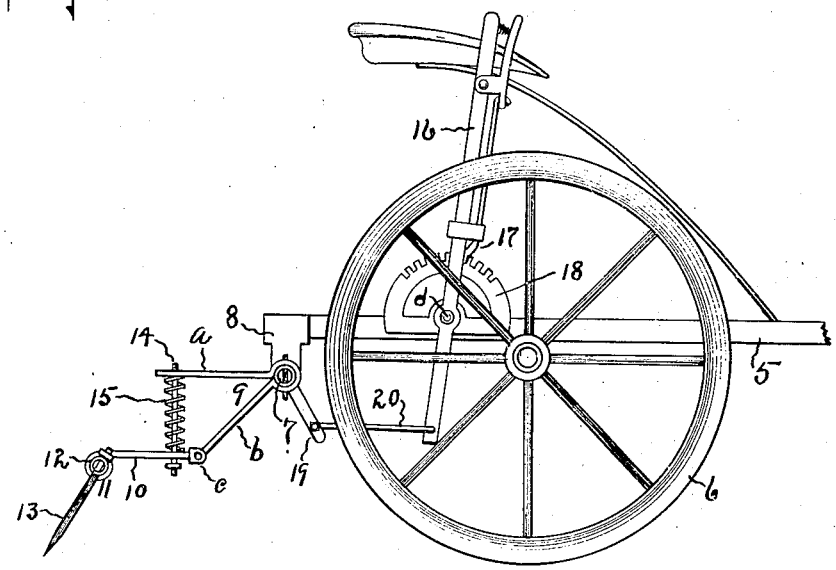
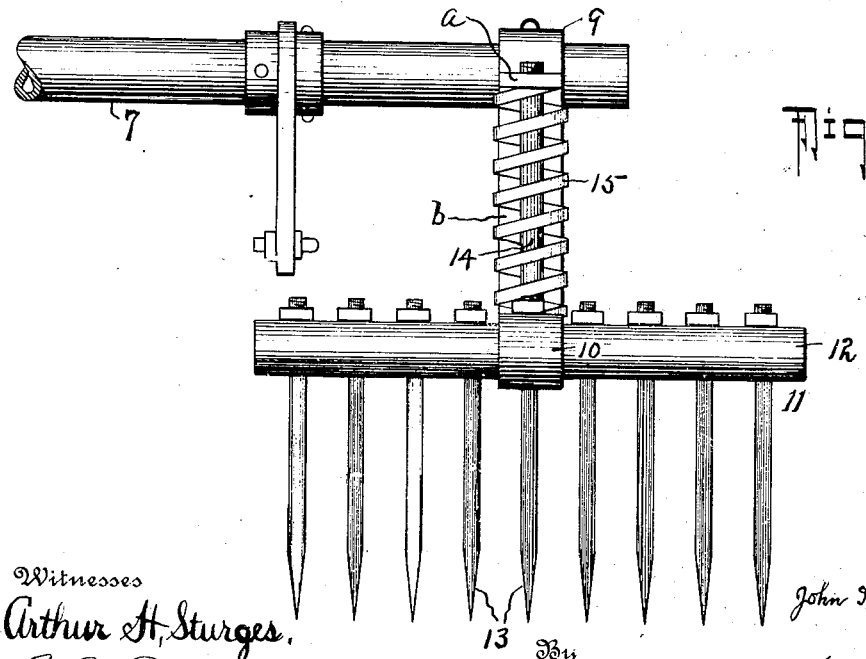

J. A. JOHNSON.
PLANTER ATTACHMENT.
APPLICATION FILED JUNE 12, 1913.
1,083,446.
Patented Jan. 6, 1914.
2 SHEETS—SHEET 1.
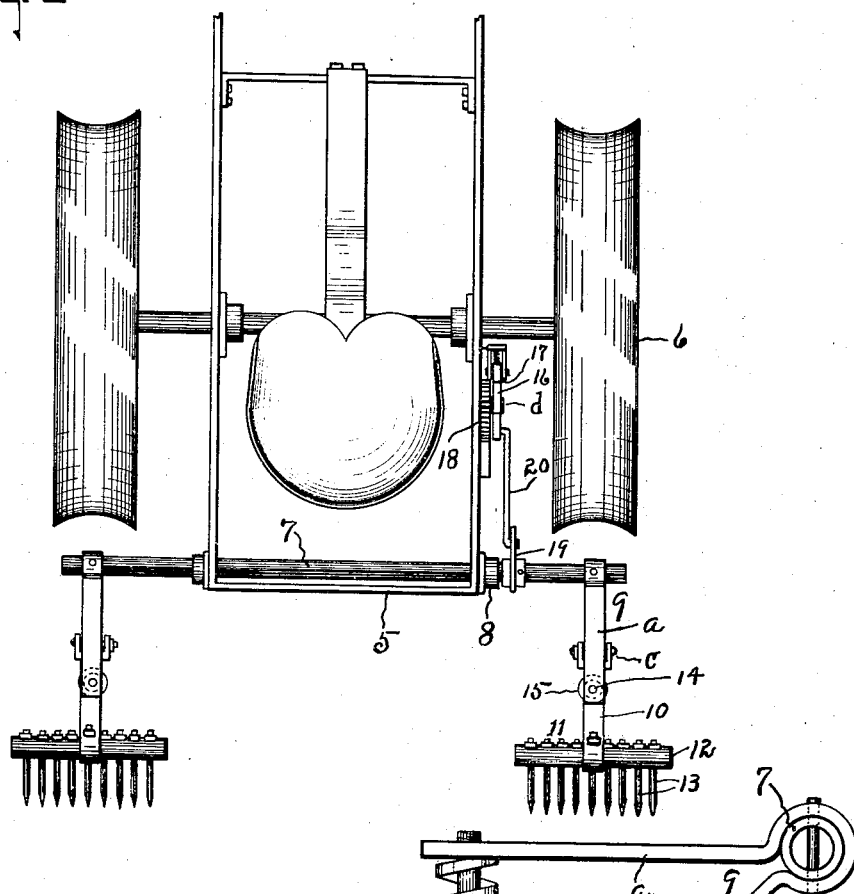
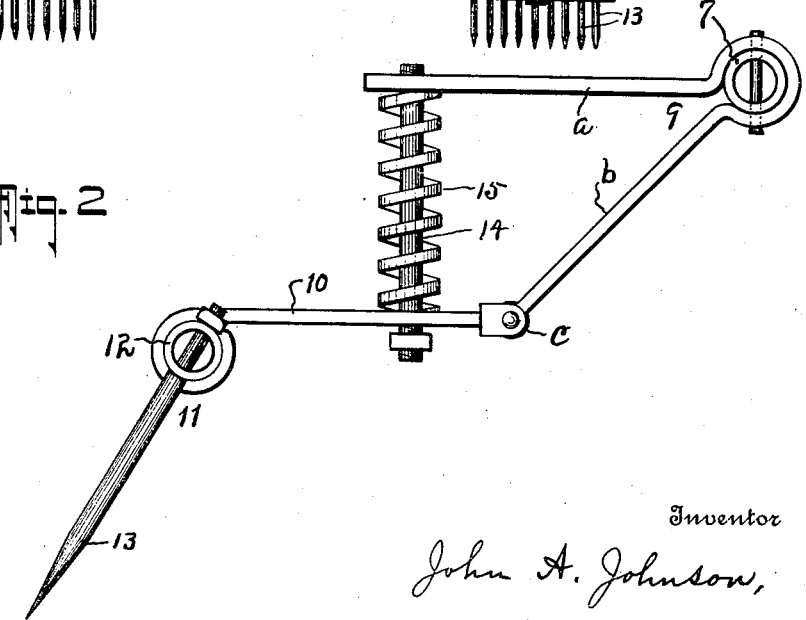
Witnesses
Arthur H. Sturges.
A. R. Leyson
Inventor
John A. Johnson,
By Hiram A. Sturges
Attorney

UNITED STATES PATENT OFFICE.

JOHN A. JOHNSON, OF PORTSMOUTH, IOWA.

PLANTER ATTACHMENT.

1,083,446.  Specification of Letters Patent.  Patented Jan. 6, 1914.

Application filed June 12, 1913. Serial No. 773,245.

*To all whom it may concern:*

Be it known that I, JOHN A. JOHNSON, a citizen of the United States, residing at Portsmouth, in the county of Shelby and State of Iowa, have invented certain new and useful Improvements in Planter Attachments, of which the following is a specification.

This invention relates to an attachment for corn planters or similar implements, and has for its object to provide a means for pulverizing and moving the ground at the rear of a forwardly moving planter so that the grooves or channels, formed by the wheels, may be filled and ridges removed.

At the time of planting, the prepared ground being then in a soft condition, deep grooves are usually formed in the ground by the wheels, and thereafter on account of storms, the grooves or channels may become deepened since they form conduits for the water, and this removal of the soil tends to uncover or dislodge the seed, especially where the land is inclined. By use of the herein described attachment the tracks or channels formed by the wheels are obliterated immediately after the seed is planted so that the effects of rains thereafter will not disintegrate the soil.

The invention includes a transverse shaft pivotally mounted on the frame and disposed at the rear of the wheels, means operative by the driver of the planter for causing a part rotation of the shaft, a follower or harrow-member disposed at the rear of each wheel and adapted to be depressed or elevated by the movement of the shaft, resilient mountings for the harrows so that they may automatically swing upward when obstructions are encountered, and means for adjusting the degree of pressure upon the ground of the teeth of the harrow-members and for adjusting their inclination.

With the foregoing objects in view and others to be mentioned, the invention presents a novel construction, combination and arrangement of parts as described herein and claimed, and as illustrated in the drawing, it being understood that changes in size, form, proportion and minor details may be made within the scope of the claims without departing from the spirit of the invention or sacrificing any of its advantages.

In the accompanying drawing, Figure 1 is a plan view of the attachment applied to the frame of a planter, the rear part only of the planter being shown. Fig. 2 is an enlarged side view of one of the yokes, depression-bars and harrows. Fig. 3 is a side view of the parts shown in Fig. 1. Fig. 4 is a rear view of the parts shown in Fig. 3.

Referring now to the drawing for a more particular description, numerals 5 indicate the frame of a corn planter or other similar implement, the wheels 6 of which when driving over prepared ground, generally cut deep grooves, furrows or channels; and in order that these channels may be obliterated and the ground immediately reformed to present a substantially even or smooth surface, certain devices are provided now to be described.

At 7 is indicated an operating shaft which may be constructed to advantage of tubular material. It is disposed transversely of the frame at the rear of the wheels, and may have bearings in brackets 8 suitably secured upon the rear part of the frame. Rigidly mounted upon and near the ends of the shaft are yokes 9 preferably of similar form and size, and each having outwardly-divergent arms *a* and *b*.

At 10 are indicated depression-bars, each being hingeably mounted at *c* upon an arm *b* of a yoke, and extending rearwardly of the frame; and each bar 10 is provided at its terminal with a harrow-member 11.

The harrow-members may have any suitable construction, but for each, the transverse head-piece 12 has been used to advantage, and provided with rigidly-mounted teeth 13, the lower side of each of bars 10 and inner sides of the teeth thereon forming an obtuse angle, as clearly shown in Figs. 2 and 3.

Mounted upon the upper arms of the yokes and loosely traversing the depression-bars are rods or guides 14 upon which are mounted the spiral springs 15.

The construction as described is such that if a rotatable movement is imparted to the shaft in a manner to cause the yokes to swing downwardly, springs 15 will be compressed, and bars 10 will be pressed downwardly to cause the harrow teeth to enter the ground. Also it will be seen that on account of the inclination of the teeth they will not accumulate weeds, stubble or other similar material during the forward movement of the vehicle. Also while moving forwardly, if a rock or similar obstruction is encountered by either of the harrows, the spring may be compressed to allow the harrow to pass over, this feature being important since it requires no attention of an operator.

In order that the harrows may be conveniently elevated or lowered, and that the teeth may be moved forcibly into the ground under control of a driver who may ride upon the implement, an upright operating-lever 16 may be provided; it is pivotally mounted between its ends upon the frame at $d$, and is provided with the pawl 17 and ratchet 18. A crank-arm 19 is rigidly mounted upon the shaft 7 and a link 20 is provided and pivotally connected with the crank-arm and lower end of lever 16.

In the use of the device, if the operator swings the hand lever rearwardly, the yokes will swing downwardly, with the result that the teeth will be forced into the ground. Arms 10, at this time, may swing upwardly a limited distance so that springs 15 will be compressed. The harrows during the forward movement of the planter will engage the ground at the rear of the wheels in a manner to break down all ridges and fill the grooves which are usually formed in the soft ground by said wheels, this being the principal object to be attained. It will be seen that, by use of the pawl and ratchet, any desired compression of the springs may be attained by the operator by an adjustment of the pawl with the ratchet, and after the pawl has been adjusted no further attention is required.

During operation, when it is desired to "turn about" at the end of a field, or when "backing" the planter, the driver moves the hand-lever forwardly, and thereupon the yokes will swing upwardly so that the teeth will not engage the ground.

Among some of the advantages to be derived by use of the invention, it may be stated that the parts employed are few and believed to be durable, and the attachment as described may be economically constructed, and may be readily applied to any planter. The parts are arranged for convenient control, and on account of the automatic features shown, no attention of an operator is required in connection with a corn planter except at the ends of the field. While useful for the purposes described, it is obvious that the device may be applied to any vehicle as a follower to pulverize the soil, break down ridges and cause any grooves, channels or pockets appearing on the surface of the ground to be filled.

Having fully described my invention, what I claim and desire to secure by Letters Patent is,—

1. Devices for the purpose described, comprising, in combination with a shaft adapted to have reciprocatory rotary movements, a pair of rigidly connected yoke-arms movable with said shaft; a pair of depression-bars, each being pivotally mounted at one of its ends upon one of said yoke-arms, its opposite end being provided with a harrow-member; and a resilient member carried by each of the other yoke-arms, said resilient member being adapted to bear upon a depression-bar between the harrow-member and the pivotal mounting of a depression-bar.

2. Devices for the purpose described, comprising, in combination with a shaft adapted to have reciprocatory rotary movements, a first outwardly-divergent arm; a second outwardly-divergent arm, said arms being disposed adjacent to each other and rigidly mounted on the shaft; a depression-bar pivotally mounted at one of its terminals upon the second outwardly-divergent arm; and a spring interposed between and adapted to bear upon the first outwardly-divergent arm and that part of the depression-bar intermediate its pivotal mounting and the harrow-member.

3. In devices for the purpose described, the combination of a rotatable shaft, a pair of rigidly connected yoke-arms movable by and transversely of the shaft; a pair of depression-bars, each being pivotally mounted at one of its ends upon one of said yoke-arms, its opposite end being provided with a harrow-member; a resilient member carried by each of the other yoke-arms, said resilient member being adapted to bear upon a depression-bar intermediate the harrow-member and the pivotal mounting of a depression-bar, the bearing of said resilient member being nearer to said pivotal mounting than to said harrow-member.

In testimony whereof I have affixed my signature in presence of two witnesses.

JOHN A. JOHNSON.

Witnesses:
J. J. HERKENRATH,
MICHAEL DAEGES.